United States Patent
Wei et al.

(10) Patent No.: US 10,429,691 B2
(45) Date of Patent: Oct. 1, 2019

(54) REGIONAL POLARIZATION STRUCTURE, METHOD FOR FABRICATING REGIONAL POLARIZATION STRUCTURE AND LIQUID CRYSTAL DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Sifan Wei, Shanghai (CN); Zhongshou Huang, Shanghai (CN)

(73) Assignees: XIAMEN TIANMA MICRO-ELECTRONICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 638 days.

(21) Appl. No.: 14/984,889

(22) Filed: Dec. 30, 2015

(65) Prior Publication Data
US 2017/0003430 A1   Jan. 5, 2017

(30) Foreign Application Priority Data
Jun. 30, 2015   (CN) .......................... 2015 1 0374874

(51) Int. Cl.
*G02B 5/30* (2006.01)
*G02F 1/1335* (2006.01)
(Continued)

(52) U.S. Cl.
CPC ......... *G02F 1/133528* (2013.01); *G02B 1/04* (2013.01); *G02B 5/3016* (2013.01);
(Continued)

(58) Field of Classification Search
CPC ............. G02B 5/3058; G02F 1/133528; G02F 2001/133538
See application file for complete search history.

(56) References Cited

U.S. PATENT DOCUMENTS

2001/0040730 A1* 11/2001 Lee ...................... G02B 5/3083
359/489.01
2009/0225264 A1* 9/2009 Fu .......................... B82Y 20/00
349/128
(Continued)

FOREIGN PATENT DOCUMENTS

CN   101526695 A   9/2009
CN   101526696 A   9/2009
(Continued)

OTHER PUBLICATIONS

Chinese Application No. 201510374874.8, First Office Action dated May 4, 2017.

*Primary Examiner* — Anthony J Frost
(74) *Attorney, Agent, or Firm* — Alston & Bird LLP

(57) ABSTRACT

A regional polarization structure, a method for fabricating a regional polarization structure and a liquid crystal display panel are provided. The regional polarization structure includes: a substrate; at least one first carbon nanotube block arranged on a first side of the substrate; and at least one second carbon nanotube block arranged on a second side of the substrate, where the first carbon nanotube block includes multiple carbon nanotubes extended in a first direction, the second carbon nanotube block includes multiple carbon nanotubes extended in a second direction, and the first direction is different from the second direction.

16 Claims, 10 Drawing Sheets

(51) Int. Cl.
*G02B 1/04* (2006.01)
*G02F 1/1337* (2006.01)
*B82Y 20/00* (2011.01)

(52) U.S. Cl.
CPC ........ *G02F 1/133707* (2013.01); *B82Y 20/00* (2013.01); *G02F 2001/133538* (2013.01); *G02F 2202/36* (2013.01); *Y10T 428/10* (2015.01); *Y10T 428/1005* (2015.01); *Y10T 428/1036* (2015.01)

(56) References Cited

U.S. PATENT DOCUMENTS

| | | | |
|---|---|---|---|
| 2009/0225265 A1 | 9/2009 | Fu et al. | |
| 2010/0045913 A1* | 2/2010 | Liu | G02F 1/133382 349/123 |
| 2010/0266814 A1* | 10/2010 | Bury | G02F 1/133788 428/156 |
| 2011/0019273 A1 | 1/2011 | Feng et al. | |
| 2011/0292311 A1 | 12/2011 | Qian et al. | |

FOREIGN PATENT DOCUMENTS

| | | |
|---|---|---|
| CN | 101852934 A | 10/2010 |
| CN | 101963681 | 2/2011 |
| CN | 101988973 A | 3/2011 |
| WO | 2009145080 A1 | 12/2009 |

* cited by examiner

REGIONAL POLARIZATION STRUCTURE, METHOD FOR FABRICATING REGIONAL POLARIZATION STRUCTURE AND LIQUID CRYSTAL DISPLAY PANEL

CROSS-REFERENCE

The present application claims priority to Chinese Patent Application No. 201510374874.8, entitled "REGIONAL POLARIZATION STRUCTURE, METHOD FOR FABRICATING REGIONAL POLARIZATION STRUCTURE AND LIQUID CRYSTAL DISPLAY PANEL", filed on Jun. 30, 2015 with the State Intellectual Property Office of People's Republic of China, which is incorporated herein by reference in its entirety.

FIELD

The present disclosure relates to the technical field of the liquid crystal display, and in particular to a regional polarization structure, a method for fabricating a regional polarization structure and a liquid crystal display panel including the regional polarization structure.

BACKGROUND OF THE INVENTION

A liquid crystal display panel has advantages of being ultra-thin, great size screen display, low power consumption, no radiation and high resolution. These features apply to current mainstream display devices and widely applied to various types of electronic devices. As shown in FIG. 1, the liquid crystal display panel according to known technology includes: a TFT array substrate 11 and a color filter substrate 12 disposed oppositely; and a liquid crystal layer 13 disposed between the TFT array substrate 11 and the color filter substrate 12.

It should be noted that, in a conventional liquid crystal display panel, in order to display an image normally, an alignment layer needs to be provided on a side of the TFT array substrate 11 facing the liquid crystal layer, such that liquid crystal molecules M have an initial deflection angle. In practice, the alignment layer of the existing liquid crystal display panel provides a uniform alignment direction at various positions, hence it is difficult to meet the requirement of different alignments at different positions of the liquid crystal display panel, thereby preventing the liquid crystal display panel from improving a display quality.

BRIEF SUMMARY OF THE INVENTION

In order to solve the above technical problem, a regional polarization structure, a method for fabricating a regional polarization structure and a liquid crystal display panel including the regional polarization structure are provided according to embodiments of the present disclosure, thereby solving the problem that the alignment layer of the existing liquid crystal display panel has a uniform alignment direction at various positions. By having a uniform alignment direction it is difficult to meet the requirement of different alignments at different positions of the liquid crystal display panel, which prevents the liquid crystal display panel from an improved display quality.

In order to solve the above problem, the following technical solutions are provided according to embodiments of the present disclosure.

A regional polarization structure is provided, which includes:

a substrate;

at least one first carbon nanotube block arranged on a first side of the substrate, where the first carbon nanotube block includes multiple carbon nanotubes extended in a first direction; and at least one second carbon nanotube block arranged on a second side of the substrate, where the second carbon nanotube block includes multiple carbon nanotubes extended in a second direction, and the second side is a side of the substrate opposite to the first side, where a projection of the first carbon nanotube block on the substrate is not overlapped with a projection of the second nanotube block on the substrate, and the first direction is not parallel with the second direction.

A liquid crystal display panel is provided, which includes at least one regional polarization structure described above.

A method for fabricating a regional polarization structure is provided, which is applied to the regional polarization structure described above. The method includes:

preparing a substrate;

forming a first carbon nanotube film on a surface of a first side of the substrate;

etching the first carbon nanotube film to form at least one first carbon nanotube block, where the first carbon nanotube block includes multiple carbon nanotubes extended in a first direction;

forming a second carbon nanotube film on a surface of a second side of the substrate, where the second side is a side of the substrate opposite to the first side; and etching the second carbon nanotube film to form at least one second carbon nanotube block, where the second carbon nanotube block includes multiple carbon nanotubes extended in a second direction, where a projection of the first carbon nanotube block on the substrate is not overlapped with a projection of the second carbon nanotube block on the substrate, and the first direction is not parallel with the second direction.

A method for fabricating a regional polarization structure is provided, which is applied to the regional polarization structure described above, and the method includes:

preparing a support plate;

forming a first carbon nanotube film on a surface of a first side of the support plate;

etching the first carbon nanotube film to form at least one first carbon nanotube block, where the first carbon nanotube block includes multiple carbon nanotubes extended in a first direction;

forming a substrate on a side of the first carbon nanotube block away from the support plate;

forming a second carbon nanotube film on a side of the substrate away from the first carbon nanotube block; and etching the second carbon nanotube film to form at least one second carbon nanotube block, where the second carbon nanotube block includes multiple carbon nanotubes extended in a second direction, where a projection of the first carbon nanotube block on the substrate is not overlapped with a projection of the second carbon nanotube block on the substrate, and the first direction is not parallel with the second direction.

As compared with the conventional technology, the technical solutions have advantages hereinafter.

The regional polarization structure according to the embodiments of the present disclosure includes: a substrate; at least one first carbon nanotube block arranged on a first side of the substrate; and at least one second carbon nanotube block arranged on a second side of the substrate, where the first carbon nanotube block includes multiple carbon nanotubes extended in a first direction, the second carbon nanotube block includes multiple carbon nanotubes extended in a second direction, and the first direction is different from the second direction, i.e., the first carbon nanotube block and the second carbon nanotube block have different alignment directions. In this way, the regional polarization structure has different alignments at different regions according to the embodiments of the present disclosure, and thereby a liquid crystal display panel including the regional polarization structure has different alignments at different regions, so as to meet the requirement of different alignments at different positions of the liquid crystal display panel, and improve display quality due to the same alignment direction at different positions of the alignment layer.

BRIEF DESCRIPTION OF THE DRAWINGS

In order to illustrate technical solutions of embodiments of the present disclosure, hereinafter drawings to be used in the description of the embodiments introduced briefly. Apparently, the drawings described below only describe some embodiments of the present disclosure, and other drawings may be obtained based on these drawings by those skilled in the art without any creative work.

DETAILED DESCRIPTION OF THE EMBODIMENTS

Hereinafter technical solutions of embodiments of the present disclosure will be described clearly and completely in conjunction with the drawings of the embodiments of the present disclosure. The described embodiments are only some embodiments of the present disclosure rather than all the embodiments. Any other embodiments obtained based on the embodiments of the present disclosure by those skilled in the art without any creative work falls within the scope of protection of the present disclosure.

In order to understand the present disclosure sufficiently, many details are set forth in the following description, but the present disclosure may be implemented by other ways different from the ways described here. Those skilled in the art may make similar popularization without deviating from the concept of the present disclosure, therefore the preset disclosure is not limited to specific embodiments disclosed hereinafter.

Figure 1:
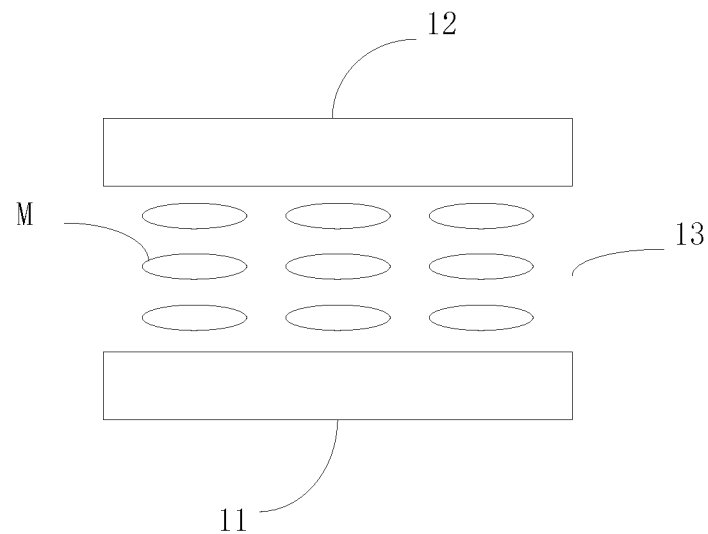
FIG. 1 is a schematic structural diagram of a liquid crystal display panel according to the conventional technology.
Figure 2:
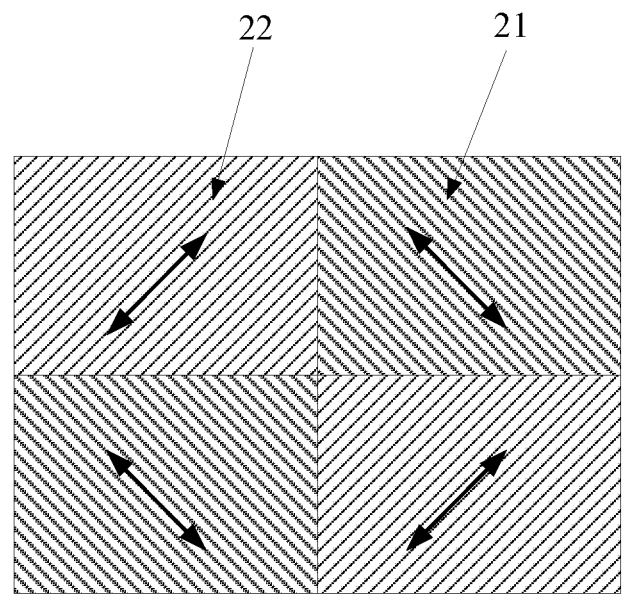
FIG. 2 is a top view of a regional polarization structure according to an embodiment of the present disclosure.
Figure 3:
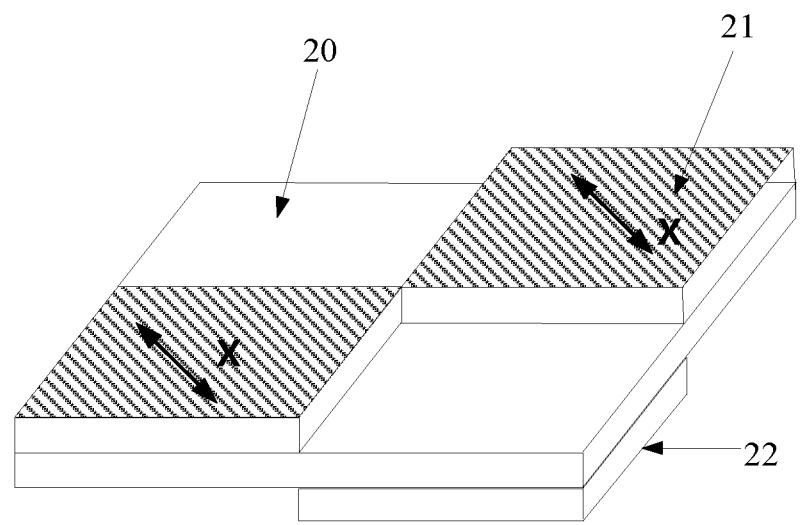
FIG. 3 is a partial cross section view of a regional polarization structure according to an embodiment of the present disclosure.
Figure 4:
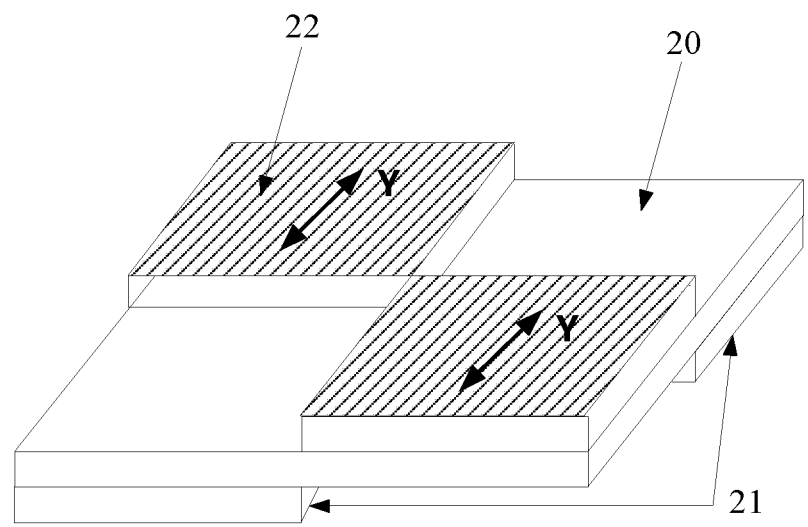
FIG. 4 is a partial cross section view of a regional polarization structure according to another embodiment of the present disclosure.
Figure 5:
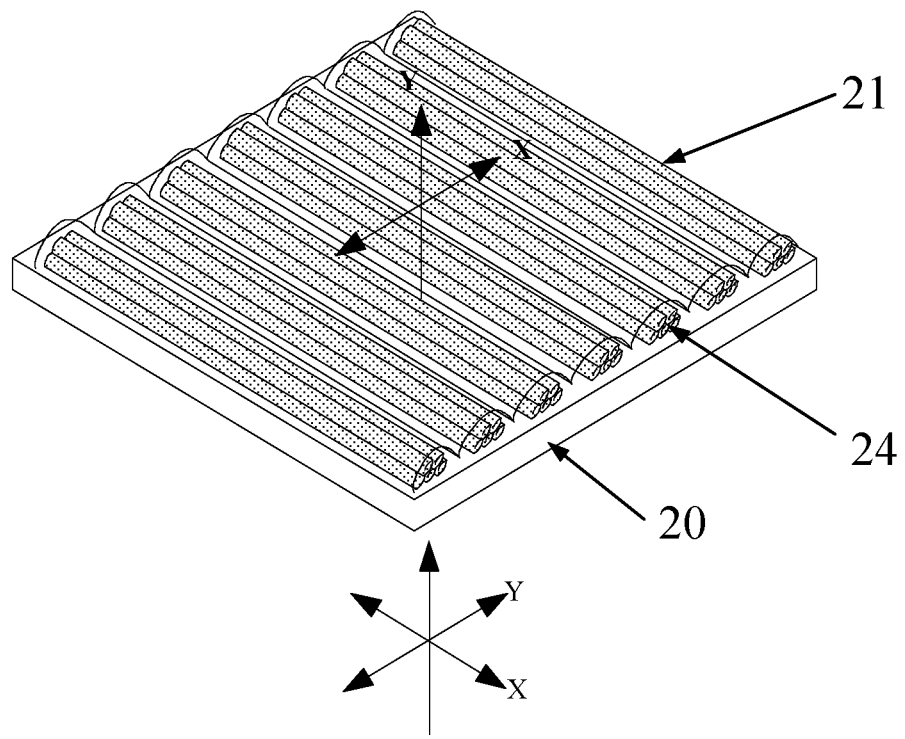
FIG. 5 is a schematic structural diagram of a first carbon nanotube block in a regional polarization structure according to an embodiment of the present disclosure.
Figure 6:
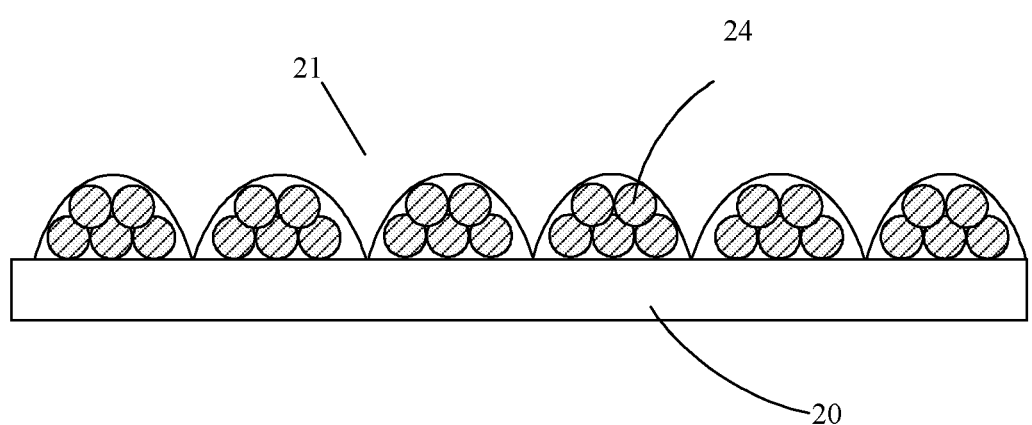
FIG. 6 is a cross section view of the first carbon nanotube block shown in FIG. 5.

A regional polarization structure is provided according to an embodiment of the present disclosure. As shown in FIG. 2 to FIG. 5, the regional polarization structure includes: a substrate 20; at least one first carbon nanotube block 21 arranged on a first side of the substrate 20, where the first carbon nanotube block 21 includes multiple carbon nanotubes 24 extended in a first direction X, as shown in FIG. 5 and FIG. 6; and at least one second carbon nanotube block 22 arranged on a second side of the substrate 20, where the second carbon nanotube block 22 includes multiple carbon nanotubes extended in a second direction Y, where the second side is a side of the substrate 20 opposite to the first side.

Figure 7:
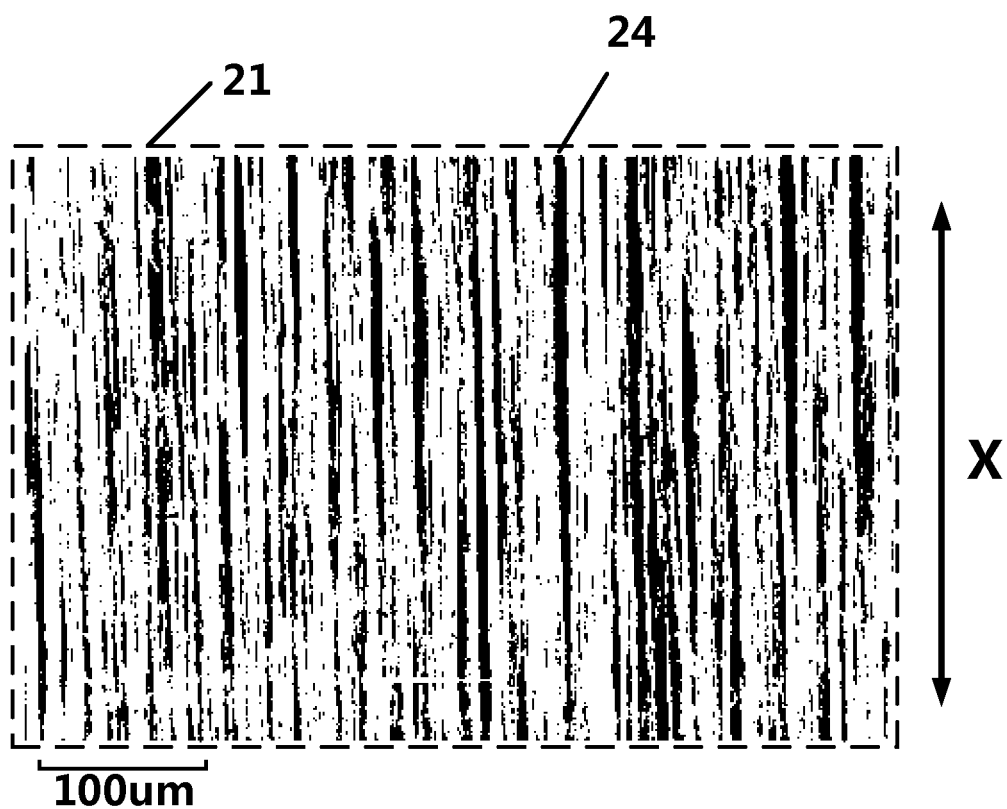
FIG. 7 is a schematic structural diagram of the carbon nanotube shown in FIG. 6 under a microscope.

It should be noted that, in the embodiment of the present disclosure, as shown in FIG. 7, adjacent carbon nanotubes 24 in the first carbon nanotube block 21 are connected to each other by the van der Waals force. That is, each carbon nanotube in the first carbon nanotube block 21 is connected to its adjacent carbon nanotube end to end in its extension direction (i.e., the first direction) by the van der Waals force. In addition, each carbon nanotube in the first carbon nanotube block 21 is also connected to its adjacent carbon nanotube in a direction perpendicular to the first direction X by the van der Waals force, thereby forming a continuous self-supported film structure.

Since all the carbon nanotubes 24 in the first carbon nanotube block 21 are extended in the first direction X, multiple grooves extended in the same direction are formed between the parallel carbon nanotubes 24. These grooves may be used to provide an initial alignment for liquid crystal molecules.

Similarly, adjacent carbon nanotubes in the second carbon nanotube block 22 are also connected to each other by the van der Waals force. That is, each carbon nanotube in the second carbon nanotube block 22 is connected to its adjacent carbon nanotube end to end in its extension direction (i.e., the second direction Y) by the van der Waals force. In addition, each carbon nanotube in the second carbon nanotube block 22 is also connected to its adjacent carbon nanotube in a direction perpendicular to the second direction Y by the van der Waals force, thereby forming a continuous self-supported film structure.

Since all the carbon nanotubes in the second carbon nanotube block 22 are extended in the second direction, multiple grooves extended in the same direction are formed between the parallel carbon nanotubes. These grooves are also used to provide an initial alignment for liquid crystal molecules.

Since the first direction is not parallel with the second direction in the regional polarization structure, a region corresponding to the first carbon nanotube block 21 and a region corresponding to the second carbon nanotube block 22 have different alignment directions. In this way, alignments of different regions in the regional polarization structure are different, and further alignments of different regions in a liquid crystal display panel including the regional polarization structure are different, so as to meet the requirement of different alignments of different positions in the liquid crystal display panel, thereby solving the problem of preventing the liquid crystal display panel from improving a display quality due to the same alignment at various positions of the alignment layer of the existing liquid crystal display panel.

It should be further noted that, in an embodiment of the present disclosure, a projection of the first carbon nanotube block 21 on the substrate is not overlapped with and a projection of the second carbon nanotube block 22 on the substrate 20, thereby ensuring that a region corresponding to one block in the regional polarization structure has only one alignment direction.

Based on the above embodiments, in an embodiment of the present disclosure, the substrate 20 has a transparent insulation structure. In another embodiment of the present disclosure, the substrate 20 has a translucent insulation structure. In an optional embodiment of the present disclosure, the substrate 20 is made from an insulation oxide. In one embodiment of the invention, substrate 20 is made of silicon dioxide. In other embodiments the substrate may be made of any material as long as the substrate 20 has certain transparency and has an insulation structure.

Based on any embodiment above, in an embodiment of the present disclosure, an angle between the first direction and the second direction is greater than 0 degrees and not greater than 90 degrees. In some embodiments, the angle between the first direction and the second direction is 90 degrees.

Based on any embodiment above, in an embodiment of the present disclosure, multiple first carbon nanotube blocks 21 may be disposed on a first side of the substrate 20. In one embodiment multiple first carbon nanotube blocks 21 are disposed on the first side of the substrate 20, and adjacent first carbon nanotube blocks 21 are connected in a direction of a diagonal line of each first carbon nanotube block 21. Similarly, multiple second carbon nanotube blocks 22 may be disposed at a second side of the substrate 20. In an embodiment of the present disclosure, multiple carbon nanotube blocks 22 are disposed on the second side of the substrate 20, and adjacent second carbon nanotube blocks 22 are connected in a direction of a diagonal line of each second carbon nanotube block 22.

Based on any embodiment above, in an embodiment of the present disclosure, the regional polarization structure further includes a support plate (not shown in Figures) arranged on a side of the first carbon nanotube block 21 away from the substrate 20, which is configured to support a structure including the first carbon nanotube block 21, the substrate 20 and the second carbon nanotube block 22. This disclosure is not limited to the above case, and in other embodiments of the present disclosure, the regional polarization structure may not include the support plate, which depends on specific cases.

Based on any embodiment above, in an embodiment of the present disclosure, the regional polarization structure further includes a first photo-alignment base material arranged between the substrate 20 and the first carbon nanotube block 21. The photo-alignment base material has an alignment function and the photo-alignment base material may calibrate an alignment direction of the first carbon nanotube block 21, resulting in improvement of alignment accuracy of a region corresponding to the first carbon nanotube block 21. In addition, the photo-alignment base material has an adhesion function and the photo-alignment base material may increase a bonding strength between the first carbon nanotube block 21 and the substrate 20, thereby enhancing firmness between the first carbon nanotube block 21 and the substrate 20.

Similarly, based on any embodiment above, in an embodiment of the present disclosure, the regional polarization structure further includes a second photo-alignment base material arranged between the substrate 20 and the second carbon nanotube block 22. The second photo-alignment base material improves alignment accuracy of a region corresponding to the second carbon nanotube block 22, improves a bonding strength between the second carbon nanotube block 22 and the substrate 20, and enhances firmness between the second carbon nanotube block 22 and the substrate 20.

Accordingly, a liquid crystal display panel is further provided according to an embodiment of the present disclosure, which includes at least one regional polarization structure according to any embodiment above.

The liquid crystal display panel according to the embodiment of the present disclosure will be illustrated by taking the regional polarization structure without support panel as an example.

Figure 8:
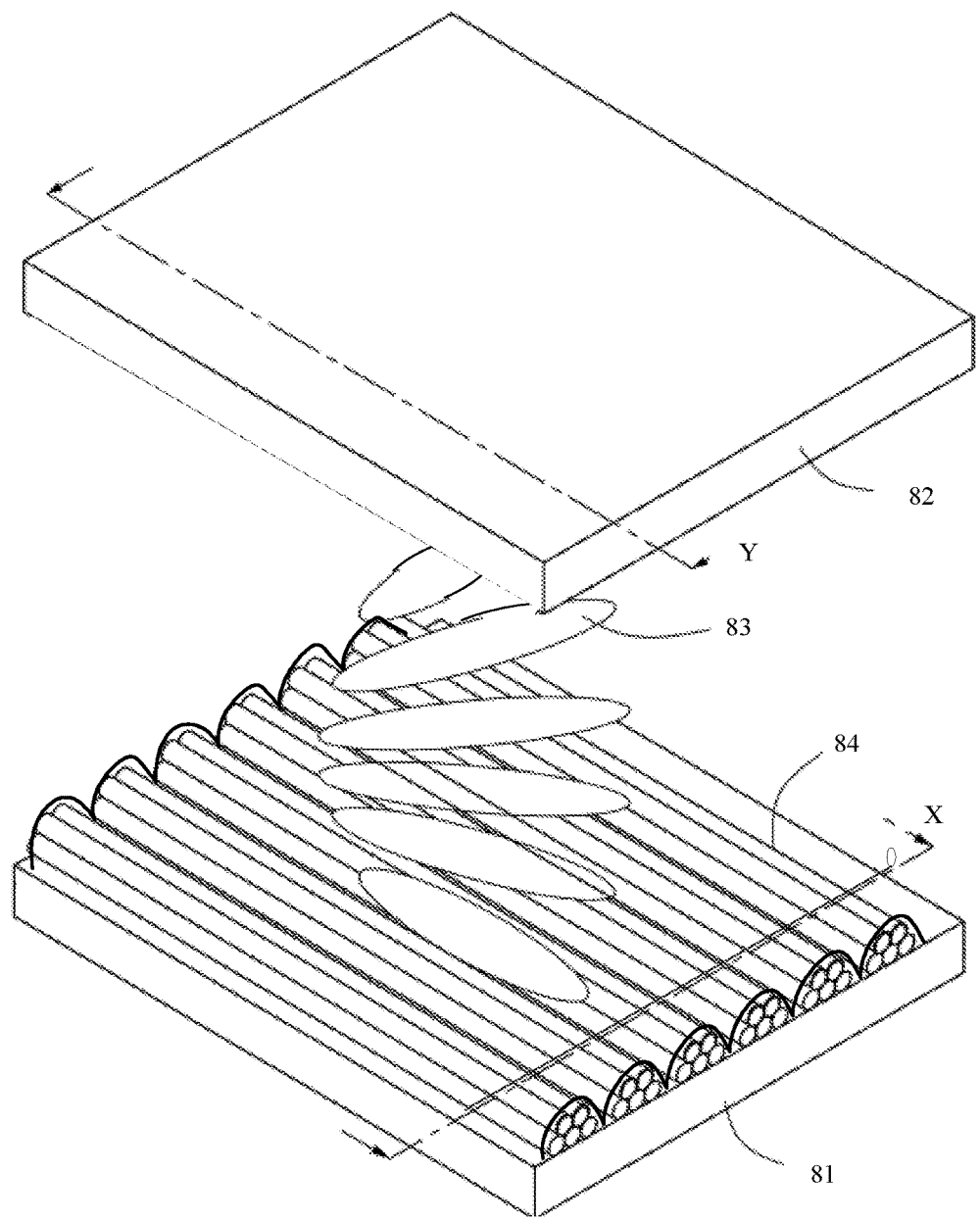
FIG. 8 is a schematic partial structural diagram of a liquid crystal display panel according to an embodiment of the present disclosure.
Figure 9:
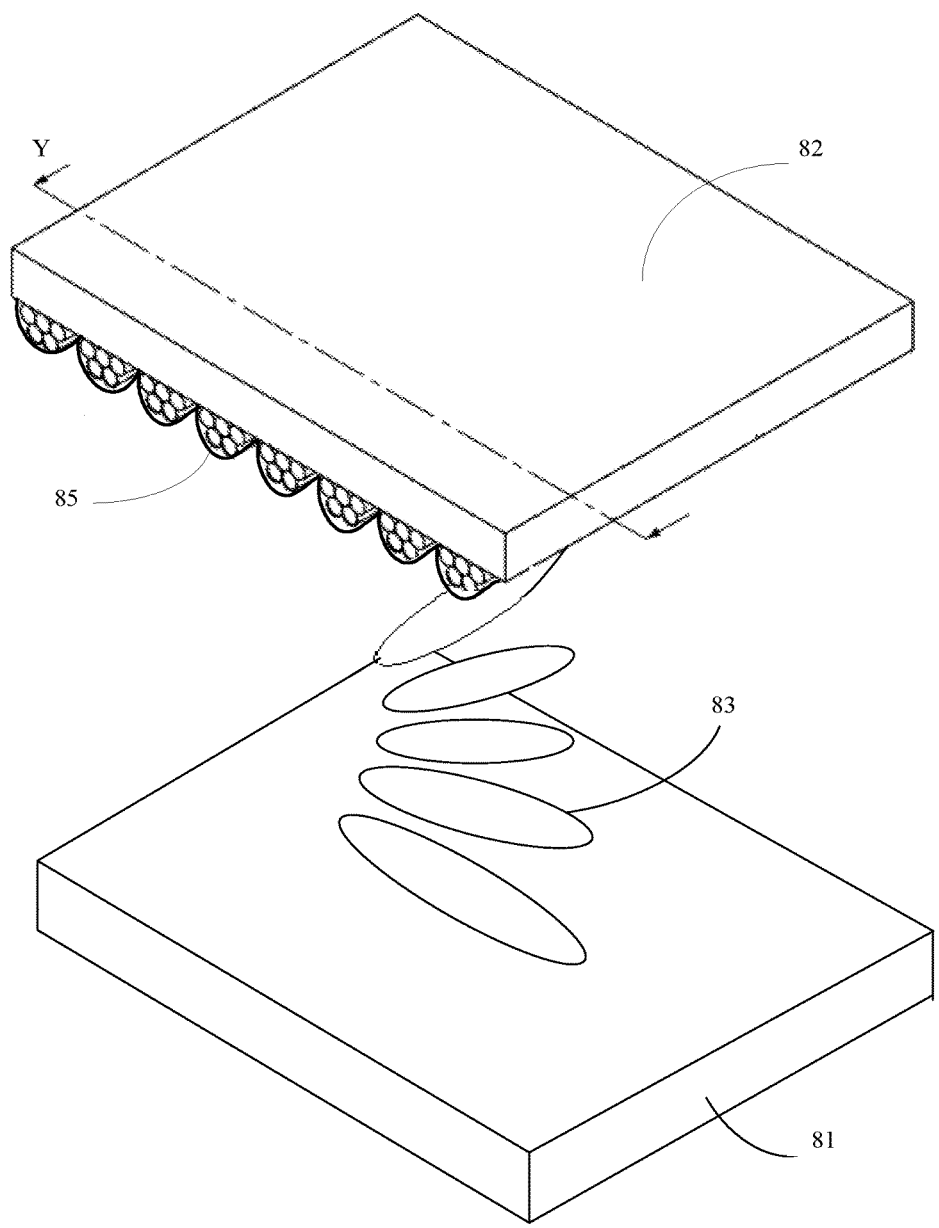
FIG. 9 is a schematic partial structural diagram of a liquid crystal display panel according to an embodiment of the present disclosure.
Figure 10:
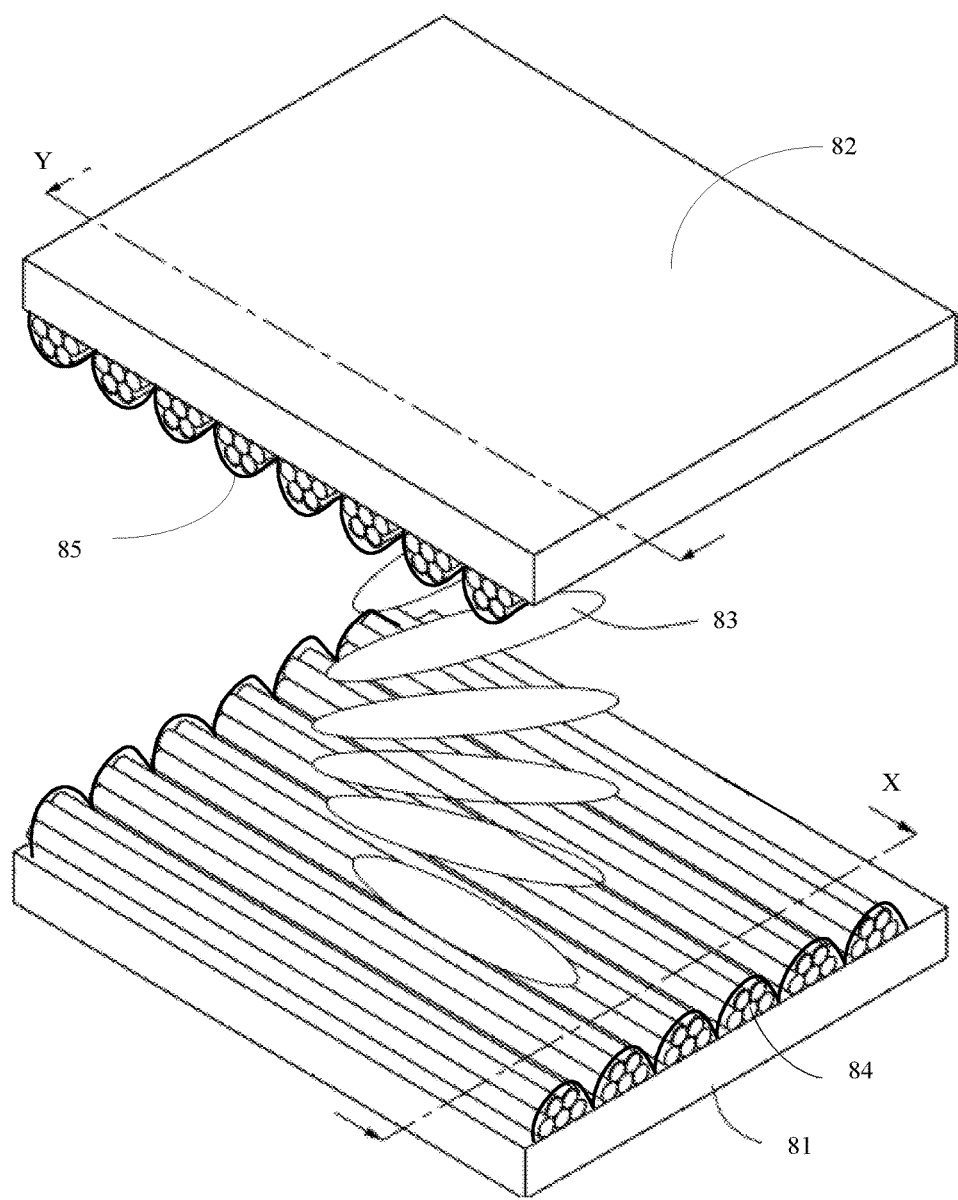
FIG. 10 is a schematic partial structural diagram of a liquid crystal display panel according to an embodiment of the present disclosure.

As shown in FIG. 8 to FIG. 10, a liquid crystal display panel is provided according to an embodiment of the present disclosure, which includes: an array substrate 81 and a color filer substrate 82 disposed oppositely; a liquid crystal layer 83 arranged between the array substrate 81 and the color filer substrate 82; a first alignment layer 84 arranged on a side of the array substrate 81 facing the liquid crystal layer 83; and a second alignment layer 85 arranged on a side of the color filter substrate 82 facing the liquid crystal layer 83, where the regional polarization structure according to any embodiment above of the present disclosure is adopted utilizing at least one of the first alignment layer 84 and the second alignment layer 85.

Based on the above embodiments, in an embodiment of the present disclosure, the liquid crystal display panel includes one regional polarization structure according to any embodiment above. In an embodiment of the present disclosure, as shown in FIG. 8, the regional polarization structure is adopted in the first alignment layer 84. In another embodiment of the present disclosure, as shown in FIG. 9, the regional polarization structure is adopted in the second alignment layer 85, which is not limited in the present disclosure and depends on specific cases.

In another embodiment of the present disclosure, the liquid crystal display panel includes two regional polarization structures according to any embodiment above of the present disclosure. In an embodiment of the present disclosure, as shown in FIG. 10, the regional polarization structure is adopted in both the first alignment layer 84 and the second alignment layer 85.

It should be noted that, in the case that the regional polarization structure includes a support plate, the regional polarization structure is also adapted to the liquid crystal display panel according to the above embodiments of the present disclosure, which is not descried herein. It should be further noted that the array substrate and/or the color filter substrate in the liquid crystal display may function as a support plate to reduce a thickness of the liquid crystal display panel and meet the development requirement for a light and thin liquid crystal display panel.

In summary, the regional polarization structure and the liquid crystal display panel including the regional polarization structure according to the embodiment of the present disclosure include: a substrate 20; at least one first carbon nanotube block 21 arranged on a first side of the substrate 20; and at least one second carbon nanotube block 22 arranged on a second side of the substrate 20, where the first carbon nanotube block 21 includes multiple carbon nanotubes extended in a first direction, the second carbon nanotube block 22 includes multiple carbon nanotubes extended in a second direction, and the first direction is different from the second direction, i.e., the alignment direction of the first carbon nanotube block 21 is different from the alignment direction of the second carbon nanotube block 22. In this way, the regional polarization structure according to the embodiment of the present disclosure has different alignments at different regions, and thereby the liquid crystal display panel including the regional polarization structure has different alignments at different regions, so as to meet the requirement of different alignments at different positions of the liquid crystal display panel, and from improves a display quality due to the same alignment direction at various positions of the alignment layer of the existing liquid crystal display panel.

In addition, a method for fabricating a regional polarization structure is further provided according to an embodiment of the present disclosure, which is applied to the regional polarization structure according to any embodiment above.

Figure 11:
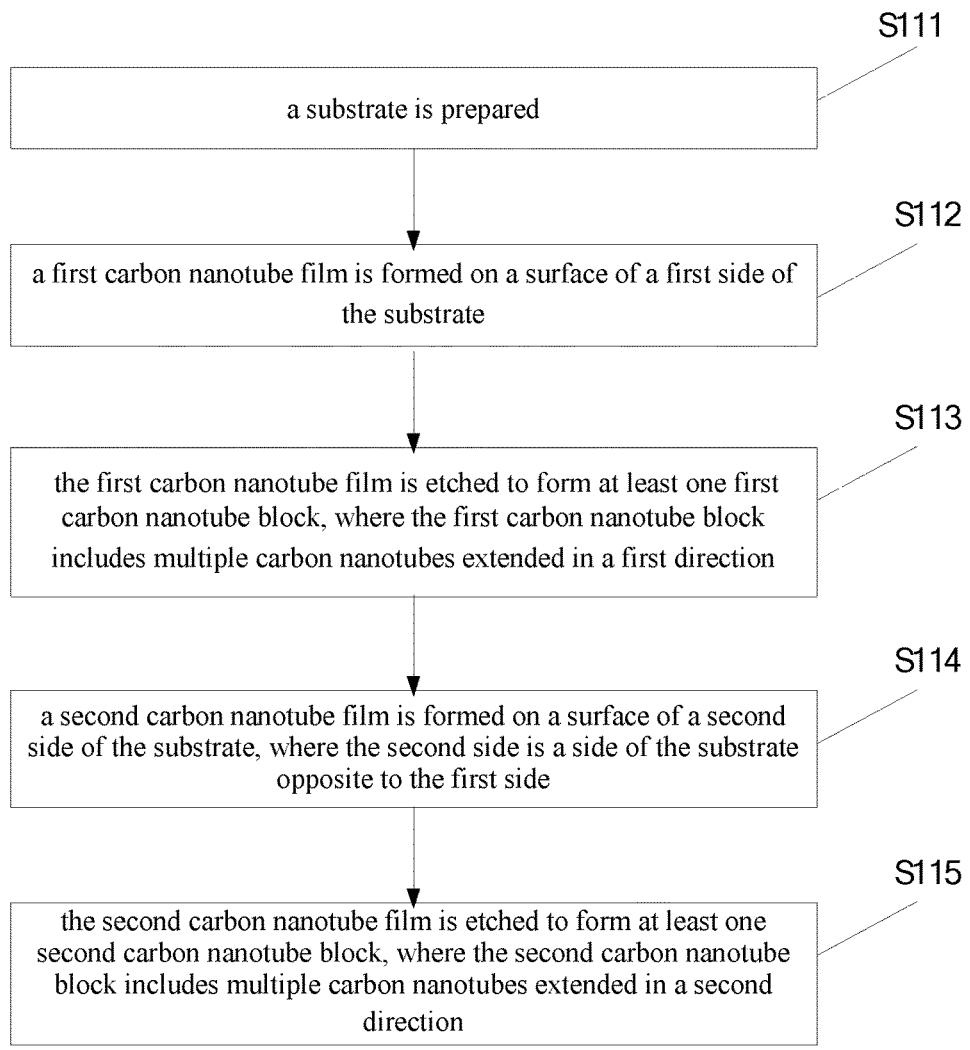
FIG. 11 is a flowchart of a method for fabricating a regional polarization structure according to an embodiment of the present disclosure.

In an embodiment of the present disclosure, the regional polarization structure does not include a support plate. As shown in FIG. 11, in the embodiment, the method for fabricating a regional polarization structure includes of steps of step S111 to step S115, and the method is not limited to this sequence.

In step S111, a substrate is prepared.

In step S112, a first carbon nanotube film is formed on a surface of a first side of the substrate.

In step S113, the first carbon nanotube film is etched to form at least one first carbon nanotube block, where the first carbon nanotube block includes multiple carbon nanotubes extending in a first direction.

In step S114, a second carbon nanotube film is formed on a surface of a second side of the substrate, where the second side is a side of the substrate opposite to the first side.

In step S115, the second carbon nanotube film is etched to form at least one second carbon nanotube block, where the second carbon nanotube block includes multiple carbon nanotubes extended in a second direction.

A projection of the first carbon nanotube block on the substrate is not overlapped with a projection of the second carbon nanotube block on the substrate, and the first direction is not parallel with the second direction.

Based on any embodiment above, in an embodiment of the present disclosure, the regional polarization structure further includes a first photo-alignment base material arranged between the substrate and the first carbon nanotube block. In the embodiment, before the first carbon nanotube film is formed on the surface of the first side of the substrate, the method for fabricating the regional polarization structure further includes: forming a first photo-alignment base material on the surface of the first side of the substrate, and forming the first carbon nanotube film on a surface of the first photo-alignment base material.

Based on any embodiment above, in an embodiment of the present disclosure, the regional polarization structure further includes a second photo-alignment base material arranged between the substrate and the second carbon nanotube block. In this embodiment, before the second carbon nanotube film is formed on the surface of the second side of the substrate, the method for fabricating the regional polarization structure further includes: forming a second photo-alignment base material on the surface of the second side of the substrate, and forming the second carbon nanotube film on a surface of the second photo-alignment base material.

Based on another embodiment of the present disclosure, the regional polarization structure further includes a first photo-alignment base material arranged between the substrate and the first carbon nanotube block and a second photo-alignment base material arranged between the substrate and the second carbon nanotube block. In this embodiment, before the first carbon nanotube film is formed on the surface of the first side of the substrate, the method for fabricating the regional polarization structure further includes: forming the first photo-alignment base material on the surface of the first side of the substrate. Before the second carbon nanotube film is formed on the surface of the second side of the substrate, the method further includes: forming a second photo-alignment base material on the surface of the second side of the substrate. Then, the first carbon nanotube film is formed on a surface of the first photo-alignment base material, and the second carbon nanotube film is formed on a surface of the second photo-alignment base material.

Figure 12:
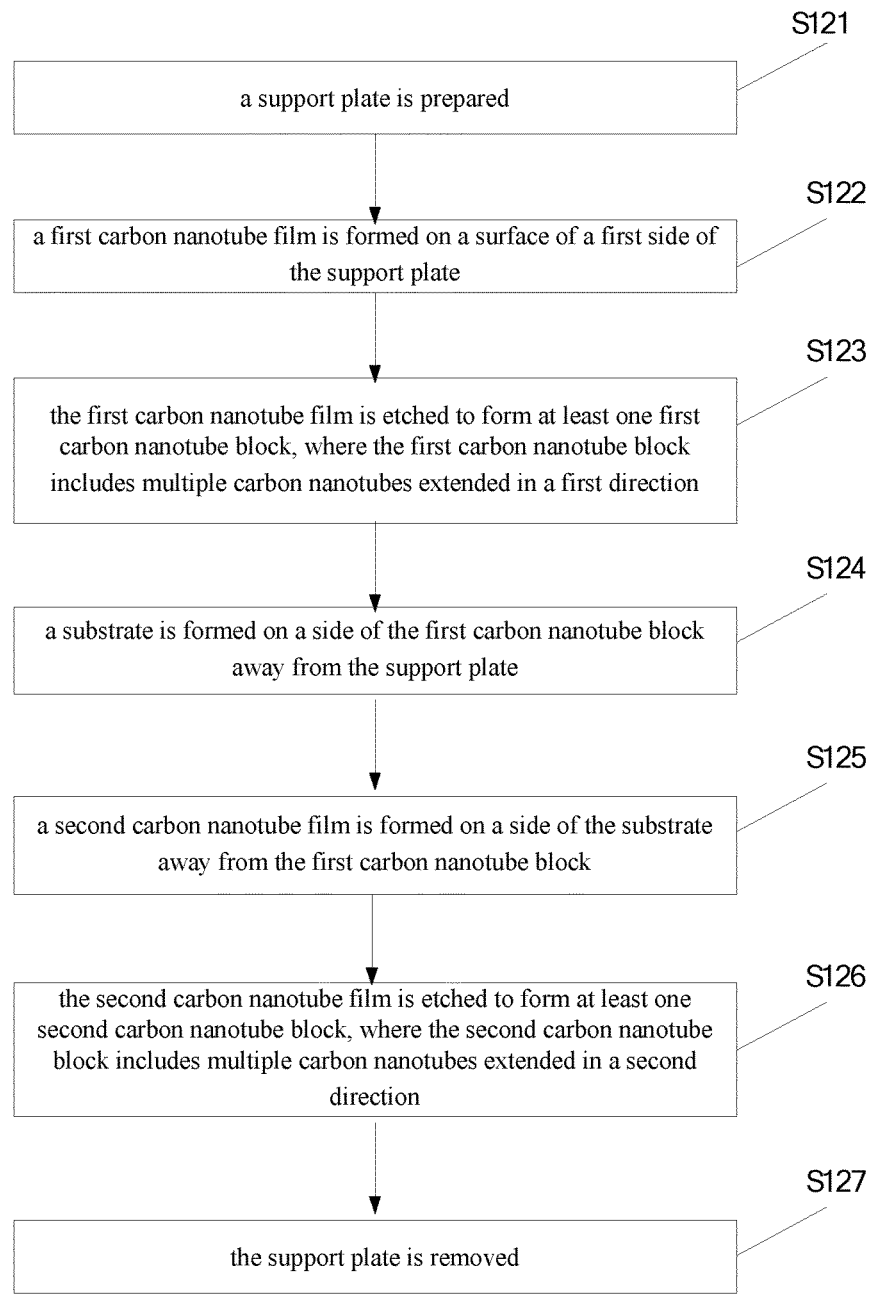
FIG. 12 is a flowchart of a method for fabricating a regional polarization structure according to another embodiment of the present disclosure.

In another embodiment of the present disclosure, as shown in FIG. 12, a method for fabricating a regional polarization structure includes steps S121-S127.

In step S121, a support plate is prepared.

In step S122, a first carbon nanotube film is formed on a surface of a first side of the support plate.

In step S123, the first carbon nanotube film is etched to form at least one first carbon nanotube block, where the first carbon nanotube block includes multiple carbon nanotubes extended in a first direction.

In step S124, a substrate is formed on a side of the first carbon nanotube block away from the support plate.

In step S125, a second carbon nanotube film is formed on a side of the substrate away from the first carbon nanotube block.

In step S126, the second carbon nanotube film is etched to form at least one second carbon nanotube block, wherein the second carbon nanotube block includes multiple carbon nanotubes extended in a second direction.

In step S127, the support plate is removed.

A projection of the first carbon nanotube block on the substrate is not overlapped with a projection of the second carbon nanotube block on the substrate, and the first direction is not parallel with the second direction.

Based on the above embodiments, in an embodiment of the present disclosure, the regional polarization structure further includes a first photo-alignment base material arranged between the substrate and the first carbon nanotube block. In this embodiment, before the first carbon nanotube film is formed on the surface of the first side of the support plate, the method for fabricating the regional polarization structure further includes: forming the first photo-alignment base material on a surface of the support plate, and forming the first carbon nanotube film on a surface of the first photo-alignment base material.

Based on any embodiment above, in an embodiment of the present disclosure, the regional polarization structure further includes a second photo-alignment base material arranged between the substrate and the second carbon nanotube block. In the embodiment, before the second carbon nanotube film is formed on the side of the substrate away from the first carbon nanotube block, the method for fabricating the regional polarization structure further includes:

forming a second photo-alignment base material on the side of the substrate away from the first carbon nanotube block, and forming the second carbon nanotube film on a surface of the second photo-alignment base material.

Figure 13:
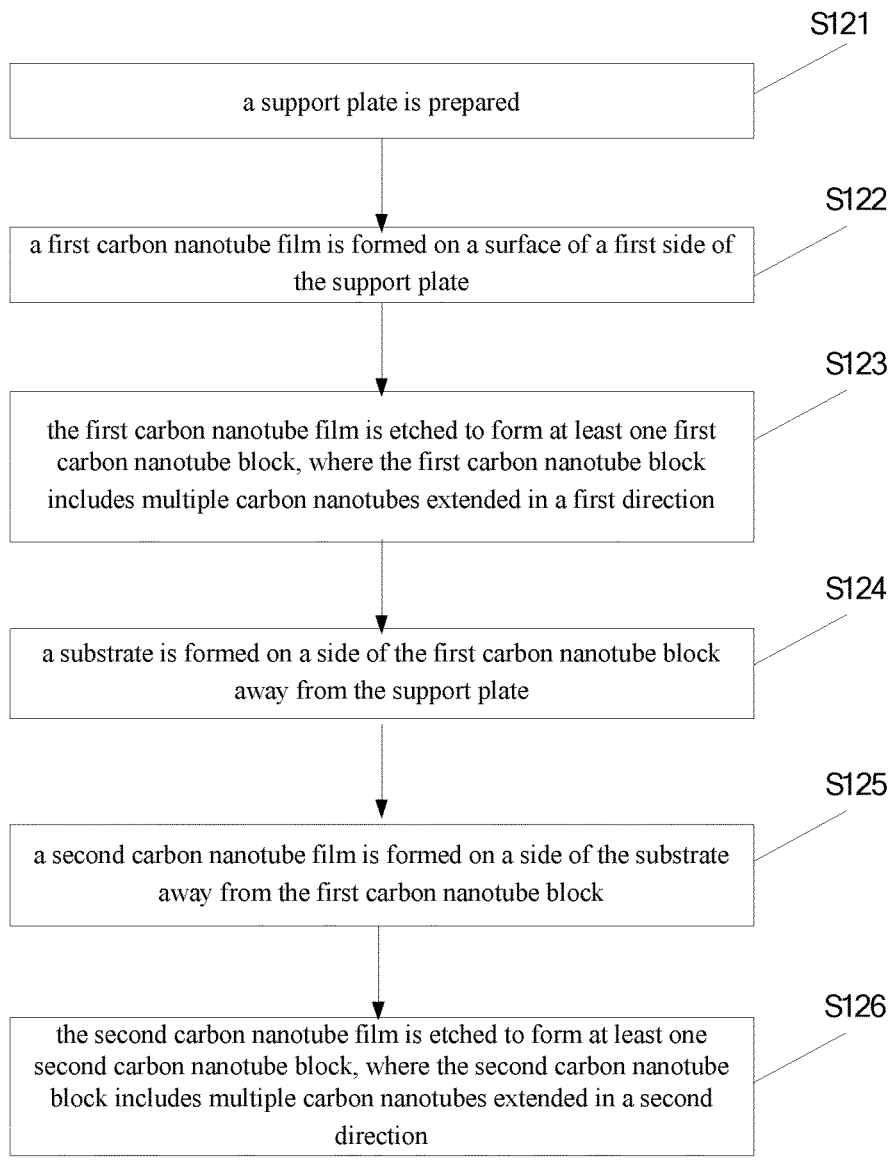
FIG. 13 is a flowchart of a method for fabricating a regional polarization structure according to still another embodiment of the present disclosure.

In an embodiment of the present disclosure, the regional polarization structure includes a support plate. As shown in FIG. 13, in the embodiment, the method for fabricating a regional polarization structure includes steps S121-S126, and the method is not limited to this sequence.

In step S121, a support plate is prepared.

In step S122, a first carbon nanotube film is formed on a surface of a first side of the support plate.

In step S123, the first carbon nanotube film is etched to form at least one first carbon nanotube block, where the first carbon nanotube block includes multiple carbon nanotubes extended in a first direction.

In step S124, a substrate is formed on a side of the first carbon nanotube block away from the support plate.

In step S125, a second carbon nanotube film is formed on a side of the substrate away from the first carbon nanotube block.

In step S126, the second carbon nanotube film is etched to form at least one second carbon nanotube block, where the second carbon nanotube block includes multiple carbon nanotubes extended in a second direction.

A projection of the first carbon nanotube block on the substrate is not overlapped with a projection of the second carbon nanotube block on the substrate, and the first direction is not parallel with the second direction.

Based on the above embodiments, in an embodiment of the present disclosure, the regional polarization structure further includes a first photo-alignment base material arranged between the substrate and the first carbon nanotube block. In this embodiment, before the first carbon nanotube film is formed on the surface of the first side of the support plate, the method for fabricating a regional polarization structure further includes: forming the first photo-alignment base material on a surface of the support plate, and forming the first carbon nanotube film on a surface of the first photo-alignment base material.

Based on any embodiment above, in an embodiment of the present disclosure, the regional polarization structure further includes a second photo-alignment base material arranged between the substrate and the second carbon nanotube block. In the embodiment, before the second carbon nanotube film is formed on the side of the substrate away from the first carbon nanotube block, the method for fabricating the regional polarization structure further includes: forming the second photo-alignment base material on the side of the substrate away from the first carbon nanotube block, and forming the second carbon nanotube film on a surface of the second photo-alignment base material.

In the method for fabricating a regional polarization structure, the first carbon nanotube block and the second carbon nanotube block are formed respectively on two opposite sides of the substrate; the first carbon nanotube block includes multiple carbon nanotubes extended in the first direction, the second carbon nanotube block includes multiple carbon nanotubes extended in the second direction, and the first direction is different from the second direction (i.e., the alignment direction of the first carbon nanotube block is different from the alignment direction of the second carbon nanotube block). In this way, the regional polarized structure has different alignments at different regions, and thereby a liquid crystal display panel including the regional polarized structure has different alignments at different regions, so as to provide different alignments at different positions of the liquid crystal display panel, improve a display quality due to the same alignment direction at various positions of the alignment layer of the existing liquid crystal display panel.

Various parts of the specification are described in a progressive way, and each part lays emphasis on differences from other parts. For the same or similar parts between various parts, one may refer to the description of other parts.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A regional polarization structure, comprising:
a substrate;
at least one first carbon nanotube block arranged on a first side of the substrate, wherein the first carbon nanotube block comprises a plurality of carbon nanotubes extended in a first direction; and
at least one second carbon nanotube block arranged on a second side of the substrate, wherein the second carbon nanotube block comprises a plurality of carbon nanotubes extended in a second direction;
wherein the second side is a side of the substrate opposite to the first side of the substrate;
wherein a projection of the at least one first carbon nanotube block on the second side of the substrate is not overlapped with the at least one second carbon nanotube block, and wherein the first direction is not parallel with the second direction;
wherein a first photo-alignment base material is arranged between the substrate and the first carbon nanotube block; and
wherein a second photo-alignment base material is arranged between the substrate and the second carbon nanotube block.

2. The regional polarization structure according to claim 1, wherein the substrate has a transparent insulation structure or a translucent insulation structure.

3. The regional polarization structure according to claim 2, wherein the substrate is made of an insulation oxide.

4. The regional polarization structure according to claim 3, wherein the insulation oxide is silicon dioxide.

5. The regional polarization structure according to claim 1, wherein an angle between the first direction and the second direction is 90 degrees.

6. The regional polarization structure according to claim 1, wherein adjacent carbon nanotubes in the first carbon nanotube block are connected to each other by the van der Waals force, and adjacent carbon nanotubes in the second carbon nanotube block are connected to each other by the van der Waals force.

7. The regional polarization structure according to claim 1, wherein adjacent first carbon nanotube blocks are connected to each other diagonally; and adjacent second carbon nanotube blocks are connected to each other diagonally.

8. The regional polarization structure according to claim 1, further comprising: a support plate arranged on a side of the first carbon nanotube block away from the substrate.

9. A liquid crystal display panel, comprising at least one regional polarization structure, wherein the regional polarization structure comprises:
   a substrate;
   at least one first carbon nanotube block arranged on a first side of the substrate, wherein the first carbon nanotube block comprises a plurality of carbon nanotubes extended in a first direction; and
   at least one second carbon nanotube block arranged on a second side of the substrate, wherein the second carbon nanotube block comprises a plurality of carbon nanotubes extended in a second direction;
   wherein the second side is a side of the substrate opposite to the first side;
   wherein a projection of the at least one first carbon nanotube block on the second side of the substrate does not overlap with the at least one second carbon nanotube block on the substrate, and wherein the first direction is not parallel with the second direction;
   wherein a first photo-alignment base material arranged between the substrate and the first carbon nanotube block; and
   wherein a second photo-alignment base material arranged between the substrate and the second carbon nanotube block.

10. The liquid crystal display panel according to claim 9, wherein the substrate has a transparent insulation structure or a translucent insulation structure.

11. The liquid crystal display panel according to claim 10, wherein the substrate is made of an insulation oxide.

12. The liquid crystal display panel according to claim 11, wherein the insulation oxide is silicon dioxide.

13. The liquid crystal display panel according to claim 9, wherein an angle between the first direction and the second direction is 90 degrees.

14. The liquid crystal display panel according to claim 9, wherein adjacent carbon nanotubes in the first carbon nanotube block are connected to each other by the van der Waals force, and adjacent carbon nanotubes in the second carbon nanotube block are connected to each other by the van der Waals force.

15. The liquid crystal display panel according to claim 9, wherein adjacent first carbon nanotube blocks are connected to each other diagonally; and adjacent second carbon nanotube blocks are connected to each other diagonally.

16. The liquid crystal display panel according to claim 9, further comprising:
   a support plate arranged on a side of the first carbon nanotube block away from the substrate.

* * * * *